United States Patent
Van Den Berg et al.

(10) Patent No.: US 9,016,237 B2
(45) Date of Patent: Apr. 28, 2015

(54) METHOD OF AND SYSTEM FOR MANAGING A GROUP OF DAIRY ANIMALS

(75) Inventors: Karel Van Den Berg, Bleskensgraaf (NL); Antoon Peter André Theelen, Etten Leur (NL); Alexander Van Der Lely, Rotterdam (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/360,814

(22) Filed: Jan. 30, 2012

(65) Prior Publication Data

US 2012/0125261 A1    May 24, 2012

Related U.S. Application Data

(63) Continuation of application No. PCT/NL2010/000096, filed on Jun. 14, 2010.

(51) Int. Cl.
| | | |
|---|---|---|
| *A01J 5/01* | (2006.01) | |
| *A01J 5/007* | (2006.01) | |
| *A01K 1/00* | (2006.01) | |
| *A01K 1/12* | (2006.01) | |
| *A01K 3/00* | (2006.01) | |

(52) U.S. Cl.
CPC .............. *A01K 1/0023* (2013.01); *A01J 5/007* (2013.01); *A01J 5/01* (2013.01); *A01K 1/12* (2013.01); *A01K 3/00* (2013.01)

(58) Field of Classification Search
USPC ............. 119/14.03, 14.08, 14.18, 510, 524, 119/14.14
See application file for complete search history.

(56) References Cited

U.S. PATENT DOCUMENTS

| | | | |
|---|---|---|---|
| 5,457,627 A * | 10/1995 | Cureton et al. .................. | 705/34 |
| 8,127,714 B2 * | 3/2012 | Sundborger et al. ........ | 119/14.02 |
| 2005/0115506 A1 * | 6/2005 | Van Den Berg et al. ... | 119/14.03 |
| 2006/0249083 A1 * | 11/2006 | Johansson et al. ......... | 119/14.03 |
| 2007/0137579 A1 * | 6/2007 | Osthues et al. ............ | 119/14.03 |
| 2008/0017118 A1 * | 1/2008 | Wigholm et al. .......... | 119/14.03 |
| 2008/0257267 A1 * | 10/2008 | Osthues et al. ............. | 119/14.04 |

(Continued)

FOREIGN PATENT DOCUMENTS

| | | |
|---|---|---|
| EP | 582350 A1 | 2/1994 |
| EP | 622019 A1 | 11/1994 |

(Continued)

OTHER PUBLICATIONS

Search Report of PCT/NL2010/000096 issued Aug. 5, 2010.

(Continued)

*Primary Examiner* — Shadi Baniani
(74) *Attorney, Agent, or Firm* — Hoyng Monegier LLP; Minerva Rivero; David P. Owen

(57) ABSTRACT

The present invention relates to a system and method of managing a group of dairy animals. More particularly, the invention relates to measuring one or more milk parameters, comparing this parameter to a criterion, and allowing an animal access to a pasture based on this comparison. The milk parameter is related to the composition of milk obtained from a dairy animal in as far as the composition is defined by at least one of the amount of protein and the energy intake of the dairy animal. The measured milk parameter is, for example, urea. Access to the pasture will be completely or partly blocked for a dairy animal having a high content of urea. This dairy animal is thus prevented from taking in an undesirably large amount of protein.

15 Claims, 1 Drawing Sheet

(56) References Cited

U.S. PATENT DOCUMENTS

| | | | |
|---|---|---|---|
| 2009/0038552 A1* | 2/2009 | Baker et al. | 119/14.03 |
| 2009/0301396 A1* | 12/2009 | Sundborger et al. | 119/14.02 |
| 2010/0064974 A1* | 3/2010 | Van Den Berg et al. | 119/14.02 |
| 2010/0180824 A1* | 7/2010 | Bright et al. | 119/14.08 |
| 2010/0192860 A1* | 8/2010 | Van Hoven | 119/14.02 |
| 2010/0236486 A1* | 9/2010 | Petersen | 119/14.03 |
| 2011/0155064 A1* | 6/2011 | De Villiers | 119/14.02 |
| 2011/0308469 A1* | 12/2011 | Vollmer et al. | 119/14.04 |
| 2012/0085287 A1* | 4/2012 | Van Hoven | 119/14.03 |
| 2012/0097107 A1* | 4/2012 | Torgerson et al. | 119/14.02 |

FOREIGN PATENT DOCUMENTS

| | | |
|---|---|---|
| EP | 896222 A2 | 2/1999 |
| WO | 2008004918 A1 | 1/2008 |
| WO | 2008/030157 A1 | 3/2008 |
| WO | 2008/048112 A1 | 4/2008 |
| WO | 2010023056 A1 | 3/2010 |

OTHER PUBLICATIONS

Notice of Opposition to Grant of Patent in New-Zealand against NZ patent application No. 596858.

Product description for the "Protrack" farm automation product, extracted from Livestock Improvement Corporation Limited's 2006 Services Catalogue, p. 38-39.

Product description for the "Protrack" farm automation product, extracted from Livestock Improvement Corporation Limited's 2007 Services Catalogue, p. 41-42.

Product description for the "Protrack" farm automation product, extracted from Livestock Improvement Corporation Limited's 2008 Services Catalogue, p. 36-37.

Article published Jun. 2009 by Zee Tags Ltd available at: http://www.zeetags.com/wawcs0114397/Latest-News.html.

Product description for the "YieldSense+" produced by Sensortec available from Jun. 2007.

Article entitled "IntelScan EL—Introducing an Entry Level ACR with Full Upgrade Path to a Complete Management System" published Apr. 7, 2006 and available at http://www.milfos.com/page.cfm?menu_id=7&nid=19.

Article entitled "Strong Interest in New Products at NZ Fieldays 2006" published Jul. 1, 2006 and available at http://www.milfos.com/page.cfm?menu_id=7&nid=29.

Article entitled "Dairy Open Day in Northland a Precursor to National Agricultural Fielday's" published Jun. 1, 2006 and available at http://www.milfos.com/page.cfm?menu_id=7&nid=27.

S. Howse, "Electronic ID", vol. 1, Proceedings of 1st Dairy Conference, Rotorua 2003.

Product brochure for the Milfos "Intelscan" product, titled "iNTELSCAN PLUS incorporating: iTRAC / iDATAFLOW / iHEAT TIME; Intelligent Solutions for Improving Your Productivity and Profit" available from at least Jun. 2008.

* cited by examiner

METHOD OF AND SYSTEM FOR MANAGING A GROUP OF DAIRY ANIMALS

CROSS REFERENCE TO RELATED APPLICATIONS

This application is a continuation of PCT application number PCT/NL2010/000096 filed on 14 Jun. 2010, which claims priority from Netherlands application number NL1037159 filed on 29 Jul. 2009. Both applications are hereby incorporated by reference in their entireties.

BACKGROUND OF THE INVENTION

1. Field of the Invention

The invention relates to a system and method of managing a group of dairy animals, and more particularly, the invention relates to measuring one or more milk parameters, comparing this parameter to a criterion, and allowing an animal access to a pasture based on this comparison.

2. Description of the Related Art

EP-A2-0.896.222 discloses a method of monitoring and controlling protein consumption by animals, which method makes use of a system. The system comprises a sensor in a milk line for measuring a content of urea in the milk. The measured value is transmitted to a computer which compares the value with a lower and an upper limit. On the basis of said comparison, the proportion of protein in the feed is adjusted.

A disadvantage of the known method is that the control in question does not always result in the desired alteration of the amount of urea in the milk.

BRIEF SUMMARY OF THE INVENTION

The invention aims at providing a method which obviates the above-mentioned drawbacks at least partially, or at least provides an alternative. In particular, the invention aims at being able to control the urea content in the milk in more circumstances.

This object is achieved by a system and method of managing a group of dairy animals. The system and method include measuring one or more milk parameters, comparing this parameter to a criterion, and allowing an animal access to a pasture based on this comparison. The milk parameter is related to the composition of milk obtained from a dairy animal in as far as the composition is defined by at least one of the amount of protein and the energy intake of the dairy animal.

More particularly, a method of managing a group of dairy animals comprises the following steps:
  extracting milk from at least one of the dairy animals;
  measuring a value of at least one milk parameter which is related to the composition of the milk as far as said composition is defined by the amount of protein and/or energy intake by the dairy animal;
  comparing at least the measured value with a criterion; and
  allowing the at least one dairy animal access to a pasture with grass, depending on a result of said comparing.

A stable for dairy animals may be provided with a so-called free exit. This makes it possible for the dairy animals optionally to remain inside or to enter a pasture. Milk is extracted from a dairy animal, for example by regularly milking it in a milking parlour, preferably by means of a milking robot.

In one embodiment, the system and method measure a value of at least one milk parameter, wherein the parameter is related to a composition of the milk, and wherein the parameter is defined by at least one of: an amount of protein intake and energy intake by the dairy animal.

According to various aspects of the present invention, the measured value of the at least one milk parameter is a parameter which relates to the concentration of a substance in the extracted milk, such as the concentration of urea in the milk, which is related to the amount of protein and/or energy intake by the dairy animal. On the basis of the concentration of urea, or of another measured parameter, it is possible to decide to offer feed with a low protein content. However, grass in a pasture may have a relatively high protein content. As a result thereof, a dairy animal which is offered feed with a low protein content, can nevertheless take in more protein than intended via the grass. Because of the invention, for such a dairy animal, access to the pasture is blocked completely or partially. Said dairy animal is thus prevented from taking in an undesirably large amount of protein. Conversely, because of the invention, it is possible to induce a dairy animal whose milk has a low urea content to eat more grass.

In particular, the method comprises measuring values of at least two different milk parameters which are related to the composition of the milk as far as said composition is defined by the amount of protein and/or energy intake by the dairy animal, determining a ratio between the measured values, and comparing the ratio with the criterion. A ratio between two milk parameters can give an indication of the efficiency of the protein conversion by a dairy animal and/or of the extent to which desired nutrients are taken in and transmitted in the milk. More in particular, the ratio is determined between an amount of protein in the milk and an amount of carbohydrates in the milk, and/or between two types of fats, such as between saturated and unsaturated fatty acids.

In one embodiment, the at least one milk parameter is an amount of urea, protein, fat, or ketone per amount of milk. The amounts of said substances give an indication of the extent to which protein in the feed is converted into protein in the milk. For example, a relatively high content of urea, or of a ketone, such as acetone, is an indication of a relatively low energy intake with respect to the amount of protein intake.

An advantageous method comprises adjusting the criterion on the basis of a factor which influences the composition of the grass in the pasture, such as the current season, meteorological circumstances, and/or an amount of nitrogen present in manure which was spread per unit area over the pasture in a period of time preceding the extraction of the milk. Sufficient rain water and/or the presence of nitrogen-rich manure result(s) in a relatively high protein content in grass. In a country like the Netherlands, this occurs on average to a high extent in spring and to a somewhat lesser extent in early autumn. Such a relatively high protein content in the grass is expressed in a change of the milk parameter, for example an increased urea content. Thanks to the invention, this will result in that the dairy animals will not, or during a shorter time, be allowed to enter the pasture in order thus to avoid a too high protein intake. In this case, it might happen that the dairy animals are no longer allowed at all to enter the pasture. This is prevented by adjusting the criterion on the basis of the above-mentioned factor.

In one embodiment, the invention includes adjusting the criterion on the basis of an individual characteristic of the at least one dairy animal, such as the lactation period, the age, the weight and/or the type of dairy animal. Individual dairy animals may have a relatively high need for protein, which justifies a relatively higher criterion. For example, a dairy animal in an early lactation stage will have more need for protein than a dairy animal which is in a later lactation stage.

In a further embodiment, the invention comprises adjusting the criterion on the basis of a parameter regarding the feeding history of the at least one dairy animal, such as an amount of liquid intake by the at least one dairy animal in a period of time preceding the extraction of the milk, and/or on the basis of the time elapsed since the last feed intake of the at least one dairy animal. A dairy animal that drinks a lot secretes relatively high amounts of urea via the urine, so that the amount of urea measured in the milk is lower than that of an animal that drinks less and for the rest has a comparable protein conversion. By lowering the criterion for the dairy animal that drinks a lot, this animal will be allowed to enter the pasture to a comparable extent as the dairy animal that drinks less. If a relatively short period of time has elapsed since the last feed intake, the influence thereof on the measured parameter will still be small. For example, if it is known that energy-rich feed has been taken in a relatively short time ago, this justifies a somewhat higher protein intake via the consumption of grass and, therefore, the urea criterion for such a dairy animal can, for example, be raised.

In a further embodiment, the invention includes adjusting the criterion on the basis of a parameter regarding the milking history of the at least one dairy animal, such as the period of time between two successive extractions of milk. With an animal that has not been milked since a relatively long time, more substances such as urea, will accumulate in the milk than with an animal that has been milked a shorter time ago and for the rest has a comparable protein conversion. By raising the criterion for measuring the milk parameter for an animal that has not been milked since a relatively long time, it is ensured that both dairy animals will be allowed comparable access to the pasture.

Yet a further embodiment comprises offering feed to the at least one dairy animal during the extraction of the milk, and adjusting the criterion depending on the composition of the offered feed and/or on the amount of feed actually consumed by the at least one dairy animal out of the amount of feed offered. If, during the extraction of the milk, the dairy animal consumes relatively energy-rich feed, it may be expected that it will be able to take in a somewhat larger amount of protein than an animal that takes in less energy-rich feed. The criterion for a dairy animal that takes in relatively energy-rich feed may thus be relatively higher than that for a dairy animal that takes in relatively less energy-rich feed.

In yet another embodiment, the invention further comprises: leading the at least one dairy animal to an interior accommodation after the extraction of the milk, waiting during a predetermined time, or until the occurrence of a predetermined event, adjusting the criterion, comparing the measured value with the adjusted criterion, and deciding again, in dependence on said comparing, on whether or not access to the pasture is allowed to the at least one dairy animal. It may thus be ensured that a dairy animal that initially had a less favourable value for the milk parameter, such as a high urea content, is forced to spend first some time in the interior accommodation prior to possibly still being admitted to the pasture. This is, for example, arranged by adjusting the criterion after the waiting. This animal will thus be allowed less time to eat grass.

In particular, the predetermined event comprises offering feed to the at least one dairy animal in the interior accommodation, and adjusting the criterion depends on the composition of the offered feed and/or on the amount of feed actually consumed by the at least one dairy animal out of the amount of feed offered. This makes it possible, for example, first to offer energy-rich feed to a dairy animal whose milk has a relatively high urea content. Dependent on this, and on the actual consumption of the feed by the dairy animal, it may be possible to still allow the dairy animal access to the pasture. This makes it possible to anticipate the influence of the adjusted feed, and admission to the pasture need not be postponed to a next measurement, so that a faster control is achieved.

In another embodiment, milk is extracted from a subgroup of a plurality of dairy animals and deciding on whether or not permission is given to enter a pasture depends on the measured milk parameter for said subgroup of a plurality of dairy animals. A subgroup is defined by being homogeneous in at least one respect. Examples of subgroups are groups of dairy animals that are in the same lactation period or have the same age. Due to working with subgroups, it is possible to average the milk parameter value over a plurality of animals, so that individual fluctuations are averaged and a decision on whether or not allowing animals access to the pasture, and to which extent, is made for the subgroup in question. If, for example, the urea content in the milk of the subgroup rises, it may be decided first to offer the dairy animals of the subgroup sufficient energy-rich feed prior to still allow the members of the subgroup access to the pasture. Working with subgroups also enables to establish individual deviations and to take an individual decision on the basis of the deviation with respect to the subgroup in question. If, for example, the urea value of one member of a subgroup rises with respect to the other members of the subgroup, it may be decided to allow the dairy animal in question no access at all to the pasture.

The invention further relates to a system for managing a group of dairy animals comprising:

a milking parlour, provided with at least one teat cup for extracting milk from a teat of a dairy animal;

a milk sensor for measuring a value of at least one milk parameter which is related to the composition of the milk as far as said composition is defined by the amount of protein and/or energy intake by the dairy animal;

a control unit, configured to compare the measured value with a criterion;

at least one passage for a dairy animal with a remotely operable closure, wherein the passage for a dairy animal provides access from the milking parlour to a pasture, and the control unit is configured to control the at least one remotely operable closure on the basis of the comparing of the measured value with the criterion.

One embodiment of the system comprises an obligatory route for the dairy animals from an exit of the milking parlour, which route leads to the pasture and to an interior accommodation, wherein the at least one passage with the remotely operable closure is included in the route. This makes it possible to lead a dairy animal of which the milk parameter has just been measured, depending on the measured value of said milk parameter, immediately to the pasture, or on the contrary to the interior accommodation. It is thus ensured, for example, that animals that are allowed access to the pasture on the basis of the milk parameter, are immediately led to the pasture where a relatively inexpensive form of feed is present in the form of fresh grass.

In another embodiment, the system comprises an interior accommodation and a first and a second animal identification sensor, wherein one of the remotely operable doors is provided in a passage from the interior accommodation to the pasture, the first animal identification sensor is provided near the milking parlour and the second animal identification sensor is provided near the passage. With the aid of the first animal identification sensor, the measured value of the milk parameter is linked to the dairy animal in question and thanks to the second animal identification sensor the system is able to retrieve said value as soon as the animal in question reports at the passage.

In another embodiment the system comprises a plurality of passages for a dairy animal with remotely operable closures. The control unit is configured to control the plurality of remotely operable closures on the basis of the comparing of the measured value with the criterion. This makes it possible, for example, to achieve a first passage immediately at the exit of the milking parlour and a second exit between, for example, an interior accommodation and the pasture. Thereby, an animal that, after the milk extraction, first enters the interior accommodation voluntarily or compulsorily, for example first to consume energy-rich feed there, can still go to the pasture via a second passage.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
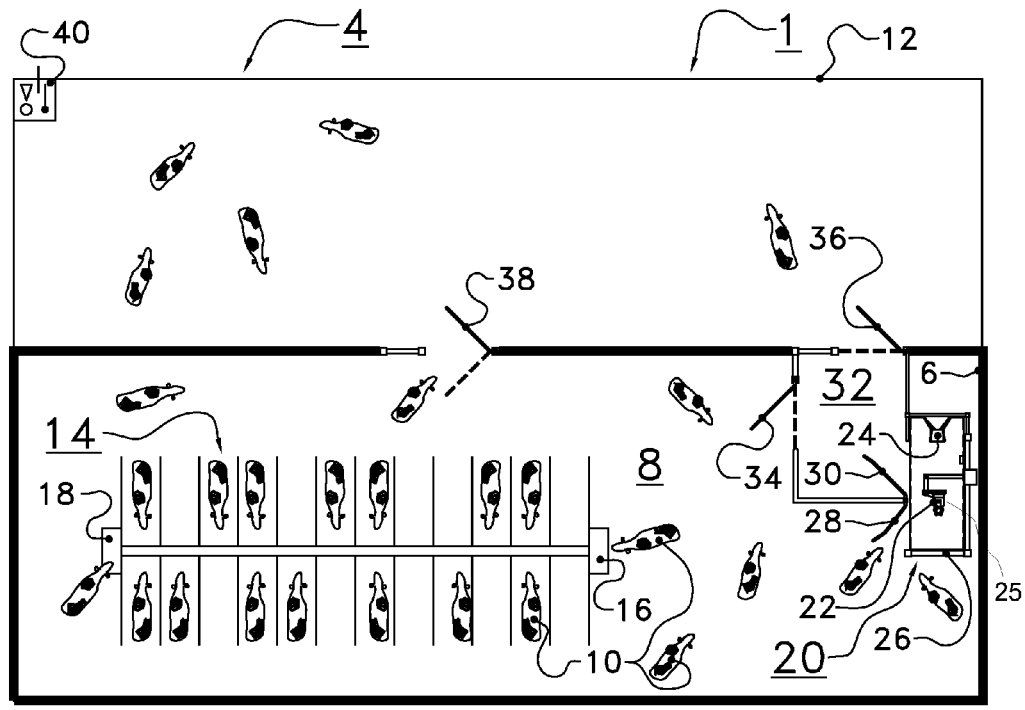
FIG. 1 shows a first embodiment of a system according to the invention.

The following is a description of certain embodiments of the invention, given by way of example only and with reference to the drawings. FIG. 1 shows a system for managing a group of dairy animals, which is denoted as a whole by reference numeral 1. The system 1 comprises a stable 2 and a pasture 4. The stable 2 is surrounded by a wall 6. The wall 6 delimits an interior space 8 of the stable 2 and prevents cows 10 from freely entering and leaving the stable. The pasture 4 is separated from the surroundings by means of a fence 12. The pasture 4 is provided with (non-shown) grass. The stable 2 is provided with a series of cubicles 14, a concentrate trough 16 and a drinking water trough 18.

The system 1 further comprises a milking parlour 20 which is provided with a milking robot 22 and a second concentrate trough 24. The milking parlour 20 is screened off from the milking stall by means of a fencing 26 and is provided with a passage for a cow with a remotely operable closure in the form of an entrance door 28 and with a remotely operable closure in the form of an exit door 30. The exit door opens to a dividing space 32. The dividing space opens to the stable space 8 via a passage for a cow with a remotely operable closure in the form of a stable door 34 and to the pasture 4 by means of a passage for a cow with a remotely operable closure in the form of a pasture door 36. The section of the wall 6 that separates the stable space 8 from the pasture 4 is provided with a passage for a cow with a remotely operable closure in the form of a stable pasture door 38.

The system 1 is further provided with a central control unit in the form of a non-shown computer. The computer controls both the milking robot and the remotely operable closures 28, 30, 34, 36, and 38. The computer further controls a non-shown automatic feeding machine, which feeding machine dispenses feed, in particular concentrate, to the first concentrate trough 16. The same, or a non-shown second, automatic feeding machine dispenses feed, in particular concentrate, to the second concentrate trough 24.

The computer is further connected to not further shown animal identification sensors, which are provided near the entrance door 28, the feed troughs 16 and 24 and the remotely operable closures 34, 36 and 38. Preferably, the drinking trough 18 is also provided with an animal identification sensor. The animal identification sensors closely co-operate with an animal identification means which is provided on each of the cows, for example in the form of a Radio Frequency Identification Device (RFID), which is known per se and will therefore not be described here in further detail.

The milking robot 22 is provided with at least one milk sensor 25 for measuring a value of at least one milk parameter which is related to the composition of the milk as far as said composition is defined by the amount of protein and/or energy intake by the dairy animal. Energy is in particular linked to the amount of carbohydrates intake. In this embodiment, the milk sensor is configured to measure a concentration of urea, protein, fat and ketone. The sensor is able to measure, within the fat category, individual concentrations of saturated and unsaturated fatty acids.

The system 1 is further provided with a weather station 40. In this embodiment, the weather station 40 is located in the pasture 4, but may also be provided elsewhere in the open air. The weather station 40 comprises a pluviometer, a thermometer, a hygrometer, and a barometer. The weather station 40 is preferably wirelessly connected to the central control unit.

Figure 2:
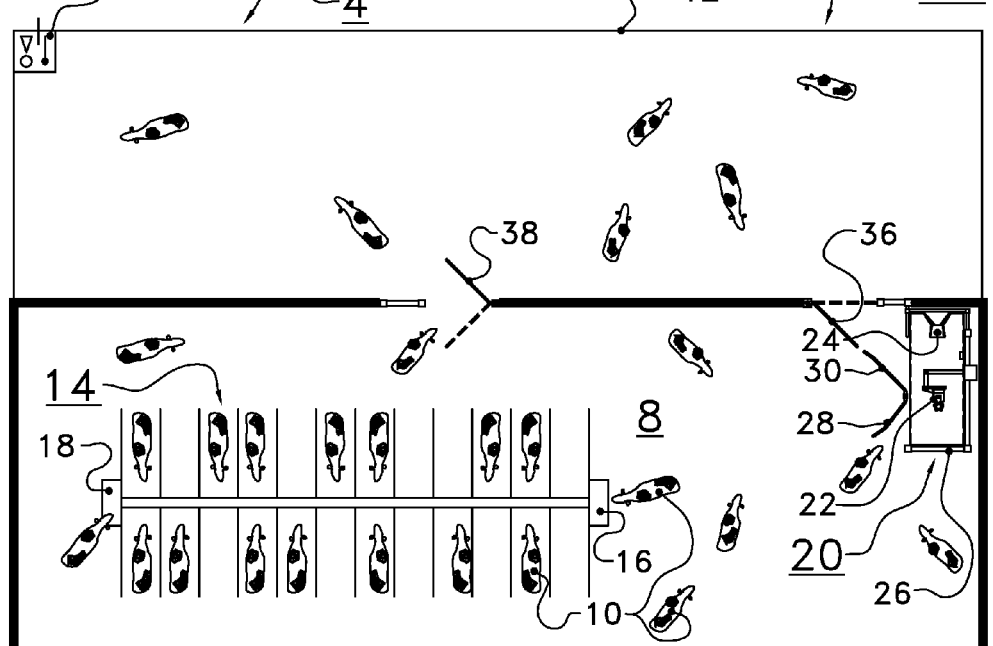
FIG. 2 shows a second embodiment of a system according to the invention.

FIG. 2 shows a second embodiment of a system 101 according to the invention, in which components corresponding to those of the system of the first embodiment are denoted by the same reference numerals. The system 101 is not provided with a dividing space 32. Instead, the exit door 30 opens directly in the stable space 8. The pasture door 36 is oriented with respect to the exit door in such a manner that these doors, in open position, form a direct passage from the milking parlour 20 to the pasture 4.

In a variant of the system 101 of FIG. 2, there is not provided a pasture door 36, so that the formation of a direct passage from the milking parlour 20 to the pasture 4 is impossible.

In the embodiments shown, all remotely operable closures are capable of being opened in one direction of rotation, with exception of the stable pasture door 38, which is rotatable in two directions. In this case, the stable pasture door 38 is remotely operable in such a manner that it only opens towards the pasture if a cow that is allowed access to the pasture 4 is identified by the animal identification sensor in question. In reversed direction, i.e. for providing access to the stable space 8 from the pasture 4, the stable pasture door 38 is free, i.e. is not remotely operated and can freely be opened by a cow that wishes to enter the stable space 8. In an alternative embodiment, also this direction of rotation is remotely operated, so that it is possible to control whether, when, and which cows enter the stable space 8.

In use, a cow 10 reports at the milking parlour 20 and is identified by the animal identification sensor at the entrance door 28, or at the feed trough 24. When the cow enters the milking parlour, the exit door 30 is closed. After the cow 10 has entered the milking parlour 20, the entrance door 28 also closes. If desired, the access of the cow 10 to the milking parlour 20 is controlled by means of a milking criterion, such as the time elapsed since the last milking or the number of cows that have been milked since the last milking. Depending on the milking criterion, the entrance door 28 can be closed for the cow 10 in question, or the exit door 30 is opened immediately in order that the cow 10 leaves the milking parlour 20.

If the cow 10 is milked, the feeding device composes a desired mixture, or composition, of concentrate, preferably on the basis of individual data of the cow in question and supplies same to the second concentrate trough 24. The milking robot 22 connects teat cups to the teats of the cow, whereafter the milking begins, so that milk is extracted. A part of the extracted milk is led along the milk sensor, where a milk parameter is measured which is related to the composition of the milk as far as said composition is defined by the amount of protein and/or energy intake by the dairy animal. Preferably, the measured milk parameter comprises at least a content of urea in the milk. A value of this measurement is compared with a criterion. The actual criterion depends inter alia on (historical) data of the dairy farm in question, including the type of the cows present. By way of example, a first criterion of 25 mg per deciliter of milk is used, while a second criterion amounts to 30 mg of urea per deciliter of milk. If the value of the measured milk parameter, in this case the concentration of urea, exceeds the first criterion, the cow in question is not allowed to enter the pasture 4 immediately after the milking. For this purpose, after the milking robot 22 has completed the milking, the pasture door 36 remains closed, while the exit door 30 and the stable door 34 (in the first exemplary embodiment) are opened, so that an obligatory route from the exit of the milking parlour 20 to the stable space 8 is created. If the cow in question subsequently immediately reports at the stable pasture door 38, she will be recognized there by the animal identification sensor in question. On the basis of data in the central control unit, in particular the latest measured urea value and the applicable first criterion, said door will remain closed. After a predetermined amount of time, for example one or two hours, has elapsed, the first criterion can be raised to, for example, 30 mg per deciliter. As a result thereof, it will be possible for a cow with a measured value of between 25 mg per deciliter and 30 mg per deciliter, to still enter the pasture 4 after an hour. It is thus ensured that it is impossible for such a cow to eat grass in the pasture during the complete time between two milkings. In this case, it is assumed that, in the period therebetween, the cow in question will consume feed that is relatively energy-rich and protein-poor in the stable.

Instead of simply waiting for a certain period of time, it is also possible to actively control the intake of energy-rich feed, by purposively offering the cow in question such feed at the first feed trough 16 and by measuring how much feed the cow in question actually consumes. This is, for example, possible by means of a weight sensor in the feed trough 16. Such energy-rich feed is, for example, rich in green maize, maize, cane treacle, cereals, or compressed potato fibres. Such feed elements have a lower protein content than fresh or silaged grass. As a result of the fact that the cow eats such relatively energy-rich and protein-poor feed in the stable space 8, on the one hand, she will be able to eat less fresh grass after having been allowed to enter the pasture 4 and, on the other hand, the amount of energy intake ensures that the protein in the grass is converted into milk protein and not, or at least to a lesser extent, into urea. After having eaten sufficiently energy-rich feed, the cow in question is thus still allowed to enter the pasture, for example by adjusting the criterion to a higher value, for example 30 mg per deciliter.

In addition to a first criterion for the urea content, use can also be made of a second criterion which, in this embodiment, amounts to, for example, 30 mg of urea per deciliter of milk. If the measured value of the urea concentration in the milk exceeds the second criterion, the cow in question is allowed no access at all to the pasture 4, not even after a predetermined period of time has elapsed or after she has consumed a specific amount of energy-rich feed. The cow in question should remain in the interior space until she is milked again and it appears from the next measurement that the urea content in the milk has actually decreased.

As already pointed out, the mentioned criteria are examples which can be adjusted to the specific circumstances. Also in use, the criterion can be adjusted within one and the same farm, it even being possible to apply different criteria for different dairy animals. The criterion can, for example, be adjusted directly, or indirectly, to the amount of protein in the grass. This protein content can, by means of a measurement, be determined directly and be supplied automatically or manually to the central processing unit. The protein content can also be estimated on the basis of seasonal data. On average, the protein content is highest in spring, while in autumn the protein content is lower than in spring, but usually higher than in summer and in winter. The protein content is also influenced by the weather. If it is found from the measurement data of the weather station 40 that in the preceding period the weather has been favourable for the growing of the grass, then it is assumed that the protein content is relatively high.

When determining an estimated protein value of the grass, it is also possible to take into account the amount of manure which has been used per unit area in a period preceding the extraction of milk. Said value may, for example, be inputted by the farmer into the central processing unit.

When adjusting a criterion on the basis of the (anticipated) protein content of the grass, two opposed considerations play a part. In the first place, a relatively high protein content of the grass means that a cow whose urea concentration is on the high side, should rather not, or not excessively, consume fresh grass. On the other hand, it is inevitable that cows that partly eat fresh grass will have a higher urea content in the milk as a result of eating said grass. In accordance therewith, a farmer will wish to avoid that, as a result of a too strict urea criterion, cows will not be allowed at all to enter the pasture, for example during the spring. These apparently opposite considerations may, for example, be combined by lowering the first criterion on the one hand and raising the second criterion on the other hand. As a result thereof, at a relatively high protein content of the grass, a cow will be forced already at a relatively low urea content first to enter the interior space in order to eat there energy-rich feed. On the other hand, almost every cow will subsequently actually be allowed to enter the pasture 4, for which purpose the second urea criterion has been raised to, for example, 35 mg per deciliter.

Instead of, or in addition to, taking into account the (anticipated) protein content of grass, measured values of different cows can also be taken into account in the adjustment of the urea criterion. Preferably, subgroups of cows are defined for this purpose, for example on the basis of the lactation period. If it is found from the measurement data of the cows of the subgroup that the values rise on average, this may give cause to upwardly adjust the criterion. An individual cow whose urea value rises more strongly than that of the rest of the subgroup in question, can still exceed said adjusted value and be refused access to the pasture completely or partially. In that case, the more average cows of the subgroup in question are, on the contrary, allowed to enter the pasture part time or full time.

Both the first and the second criterion can be adjusted for an individual cow on the basis of a measured amount of liquid intake by the cow at the drinking water trough 18. For this purpose, the drinking water trough 18 in question is not only provided with an animal identification sensor, but also with liquid measuring means, in the form of a weight sensor and/or of a flow sensor, so that it is possible to establish for each cow how much water has been consumed. If a cow drinks relatively much water, the amount of urea in the blood and the milk will decrease, because more urea is excreted via the urine. Conversely, a cow that drinks relatively little has a higher urea value in the milk. However, these differences do not reveal anything about the actual conversion of protein into urea, but only indicate the dilution of the amount of urea formed. In accordance herewith it may be desirable to adjust the individual criteria for the cows in question to this degree of dilution which can be deduced indirectly from the amount of water intake.

The individual criterion can be adjusted further on the basis of the amount of concentrate consumed by the cow in question from the second concentrate trough 24 during the milking and/or on the basis of the amount of concentrate which the cow in question has possibly taken in prior to entering the milking parlour 20. In this case, not only the amount of concentrate intake, but also the time elapsed since the intake in question, can be taken into account. If this period of time is relatively short, the amount of energy intake has not yet influenced the protein conversion and it may be assumed that the available amount of energy will still be used if the cow will subsequently take in protein-rich feed, such as grass, in the pasture 4. Furthermore, the criterion can be adjusted on the basis of the time between milkings, i.e. the time elapsed since the last milking of the cow. The longer the time between milkings, the higher the urea content will be in general. This is caused by the fact that the urea enters the milk from the blood. However, this is not indicative of the (possibly undesirably high) amount of urea in the blood.

The individual criterion can also be adjusted on the basis of the lactation phase of the cow 10. At the start of the lactation phase, the cow has a greater need for protein and will usually draw on her own body reserves. As a result, the urea content in the blood and the milk can rise. In order still to allow such a cow (to some extent) access to the pasture, the individual criterion can be raised.

In addition to the described embodiment, many variants are possible within the scope of the invention. In the alternative systems described above, the situation may be such that the stable pasture door 38 is not remotely operable and is, for example, is designed as a one-way door in order only to enable access to the interior space 8 of the stable from the pasture 4. In such a system, it is only possible to determine immediately after the extraction of milk whether a dairy animal will enter the pasture or will stay in the stable space until the next extraction of milk.

In an alternative system, based on the second embodiment of FIG. 2, but without pasture door 36, a dairy animal that leaves the milking parlour 20 will always walk via the stable space 8 before, depending on the measured milk value and the criterion, possibly being allowed to enter the pasture 4 via the stable pasture door 38. In such a case, the dairy animal thus does not follow an obligatory route. In the case of the embodiment of FIG. 1, an alternative use provides that—if a dairy animal can be allowed to enter the pasture 4 on the basis of the measured values and the milking criterion—not only the pasture door 36, but also the stable door 34, will open. In this variant, the dairy animal in question itself will be able to decide whether it wishes to go to the pasture, or to the stable space 8.

In a way of using the above described systems, instead of or in addition to the urea criterion, another criterion can be applied as well. Such a criterion can be based on a milk parameter, such as the amount of ketone per amount of milk. A surplus of ketone, in particular acetone, is an indication of a too low energy intake. In such a case, the cow in question can better eat only energy-rich concentrate, or at least first eat energy-rich concentrate, before entering the pasture. A limit value for the concentration of acetone can amount to between 400 and 700 µmol per liter of milk.

Another alternative is to determine a ratio between two measured values of different milk parameters and to compare this ratio with a criterion. In this case, the protein content and the urea content in the milk can be defined as two milk parameters. A low protein content combined with a relatively high urea content indicates a lack of energy. In general, such a cow will be refused access to the pasture 4 and will have to eat energy-rich feed, such as maize, in the stable space 8. A cow having a low protein content combined with a low urea content can enter the pasture 4 without problem, or it can at least be decided to leave the cow in question in the pasture for a longer period of time. A cow having a high protein content combined with a high urea content will preferably have to eat concentrate prior to being allowed to enter the pasture. An alternative for the protein/urea ratio is the ratio between the amount of protein and fat in the milk.

The invention can further be used to achieve a desired fatty acid composition of the milk. For this purpose, values are measured of milk parameters that relate to the amount of saturated and unsaturated fatty acids per amount of milk. Since grass is relatively rich in unsaturated fatty acids, a cow whose amount of unsaturated fatty acids is below a certain criterion will get access to the pasture 4 and preferably follow an obligatory route to the pasture. There are preferably measured polyunsaturated fatty acids, such as CLA and/or omega-3-fatty acids (alpha-linolene acid). A criterion for omega-3 above which the cow should eat more grass can be selected from a range of 5-8 mg per gram of fat. A criterion based on CLA can be selected from a range of 5-7 mg per gram of fat.

The criterion for the ratio between polyunsaturated fatty acids and the total of fats is preferably made dependent on external circumstances, such as the season. In the spring, for example, it is possible to obtain higher contents of polyunsaturated fatty acids, while in the winter the contents will be lower than in the summer and the autumn. Incidentally, the content of unsaturated fatty acids can also be influenced by feed that is provided via the concentrate trough 16, for example by providing lumps of grass therein. It is thus possible, depending on the season, that a criterion for the content of polyunsaturated fatty acids results in that, according to the invention, the cow in question should stay in the stable space 8 in order to eat lumps of grass from the concentrate trough 16.

Instead of one milk sensor that measures a plurality of milk parameters, it is possible to opt for a milk sensor that measures only one milk parameter or a plurality of milk sensors each milking one or a plurality of milk parameters. The manner in which the milk sensor, or milk sensors, in question measures/measure a value of at least one milk parameter which is related to the amount of protein and/or energy intake by the dairy animal can vary. It is, for example, possible to measure a (near) infrared spectrum of an amount of milk that is heated. It is possible to determine from this spectrum the presence and concentration of different relevant molecules, such as urea, fat and protein. Alternatively, an amount of milk can be provided with a reagent, such as urease (urea amidohydrolase). Urease is an enzyme that catalyses the hydrolysis of urea to carbonium dioxide and ammonia. The presence of ammonia and the amount thereof can subsequently be established with the aid of a specific colorant that reacts with ammonia. The colour intensity is subsequently measured. This colour intensity is a milk parameter which is related to an amount of urea in the milk and thus to the amount of protein and/or energy intake by the dairy animal. This milk parameter can also be defined more directly, by adding a colorant such as diacetylmonoxime, which reacts with urea and then forms a pink colour, in which case the intensity of the pink colour is the milk parameter to be measured.

In an advantageous method, the decision depends on a plurality of measured values of the same at least one dairy animal, and/or of different dairy animals. Fluctuations of individual measurements can thus be averaged in order to avoid that a dairy animal is refused access to the pasture, or, on the contrary, is wrongly allowed access to the pasture, on the basis of one single measurement.

The measured value of the milk parameter can relate to only the last measurement on the milk, or can be a progressing average over the last N measurements, in which N is a quite natural number, greater than 1. N is preferably equal to 2, 3, 4, 5, 6, 7, or 8.

In particular, the invention does not relate to measuring a parameter that gives an indication of an illness, such as measuring the cell count, or the salt content, as an indication of the presence of mastitis.

In addition to extracting milk in a milking parlour by means of a milking robot, it is possible to extract milk at other moments and in other ways. It is possible, for example, to take only a small sample of the milk, without the dairy animal in question further being milked completely. It is also possible to milk the dairy animal by means of a non-robotized milking machine. The milking parlour may be located in a stable, but may also be located outside. In that case, the dairy animal milked can be led inside from the milking parlour if the measured value of the milk parameter gives cause for this.

Instead of by one computer, the central control unit may also be formed by a plurality of, preferably mutually coupled, computers for controlling the individual components of the system 1. A smaller number of animal identification sensors than described may suffice. It may, for example, be decided to provide only one animal identification sensor at the milking parlour 20, at the entrance door 28, or at the second feed trough 24. It may also be decided to provide no identification sensors at the remotely operable closures 34 and/or 36 and to control these on the basis of the identification at the milking parlour 20 of the dairy animal that is the last one that was milked. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A system for managing a group of dairy animals, comprising:
   a milking parlour provided with at least one teat cup for extracting milk from a teat of a dairy animal;
   a milk sensor for measuring a value of at least one milk parameter, wherein the milk parameter is an amount of at least one of urea, protein, fat, or ketone per amount of milk;
   a control unit, configured to compare the measured value with a criterion;
   at least one passage for a dairy animal with a remotely operable closure; wherein
   the passage for a dairy animal provides access from the milking parlour to a pasture, and
   wherein the control unit, on the basis of the comparing of the measured value with the criterion, controls the at least one remotely operable closure to prevent access to the passage by at least one dairy animal, and the control unit is further configured to: lead the at least one dairy animal to an interior accommodation after the extraction of the milk, wait during a predetermined time, or until the occurrence of a predetermined event, adjust the criterion on the basis of a factor which influences the composition of the grass in the pasture, compare the measured value with the adjusted criterion, and decide again, in dependence on said comparison, whether or not access to the pasture is allowed for the at least one dairy animal.

2. The system according to claim 1, further comprising an obligatory route for the dairy animals from an exit of the milking parlour, wherein the route leads to the pasture and to an interior accommodation, wherein the at least one passage with the remotely operable closure is included in the route.

3. The system according to claim 1, further comprising an interior accommodation and a first and a second animal identification sensor, wherein one of the remotely operable closures is provided in a passage of the interior accommodation to the pasture, the first animal identification sensor is provided near the milking parlour and the second animal identification sensor is provided near the passage.

4. The system according to claim 1, comprising a plurality of passages for a dairy animal with remotely operable closures, wherein the control unit is configured to control the plurality of remotely operable closures on the basis of the comparing of the measured value with the criterion.

5. The system according to claim 1, wherein the milk sensor is configured to measure values of at least two different milk parameters, and wherein the control unit determines a ratio between the measured values, and compares the ratio with the criterion.

6. The system according to claim 1, wherein the factor comprises at least one: a current season, a meteorological circumstance, and an amount of nitrogen present in manure which was spread per unit area over the pasture in a period of time preceding the extraction of the milk.

7. The system according to claim 6, wherein the individual characteristic comprises at least one of: the lactation period, the age, the weight and the type of dairy animal.

8. The system according to claim 1, wherein the control unit adjusts the criterion on the basis of an individual characteristic of the at least one dairy animal.

9. The system according to claim 1, wherein the control unit adjusts the criterion on the basis of a parameter regarding the feeding history of the at least one dairy animal.

10. The system according to claim 9, wherein the feeding history parameter comprises at least one of: an amount of liquid intake by the at least one dairy animal in a period of time preceding the extraction of the milk, and time elapsed since the last feed intake of the at least one dairy animal.

11. The system according to claim 1, wherein the control unit adjusts the criterion on the basis of a parameter regarding the milking history of the at least one dairy animal.

12. The system according to claim 11, wherein the parameter comprises a period of time between two successive extractions of milk.

13. The system according to claim 1, wherein the control unit is further configured to control a feeding machine which offers feed to the at least one dairy animal during the extraction of the milk, and adjusts the criterion depending on at least one of: a composition of the offered feed and an amount of feed actually consumed by the at least one dairy animal out of an amount of feed offered.

14. The system according to claim 1, wherein the control unit waits until the occurrence of the predetermined event, and the predetermined event comprises: offering feed to the at least one dairy animal in the interior accommodation, and wherein adjusting the criterion further depends on at least one of: a composition of the offered feed and on an amount of feed actually consumed by the at least one dairy animal out of an amount of feed offered.

15. The system according to claim 1, wherein after a subgroup of a plurality of dairy animals has visited the milking parlour, the control unit determines whether or not permission is given to said subgroup of a plurality of dairy animals to enter the pasture depending on the measured milk parameter for said subgroup of a plurality of dairy animals.

* * * * *